May 31, 1966  H. J. GRIEB  3,253,406
TURBINE PROPULSION UNIT
Filed July 19, 1963
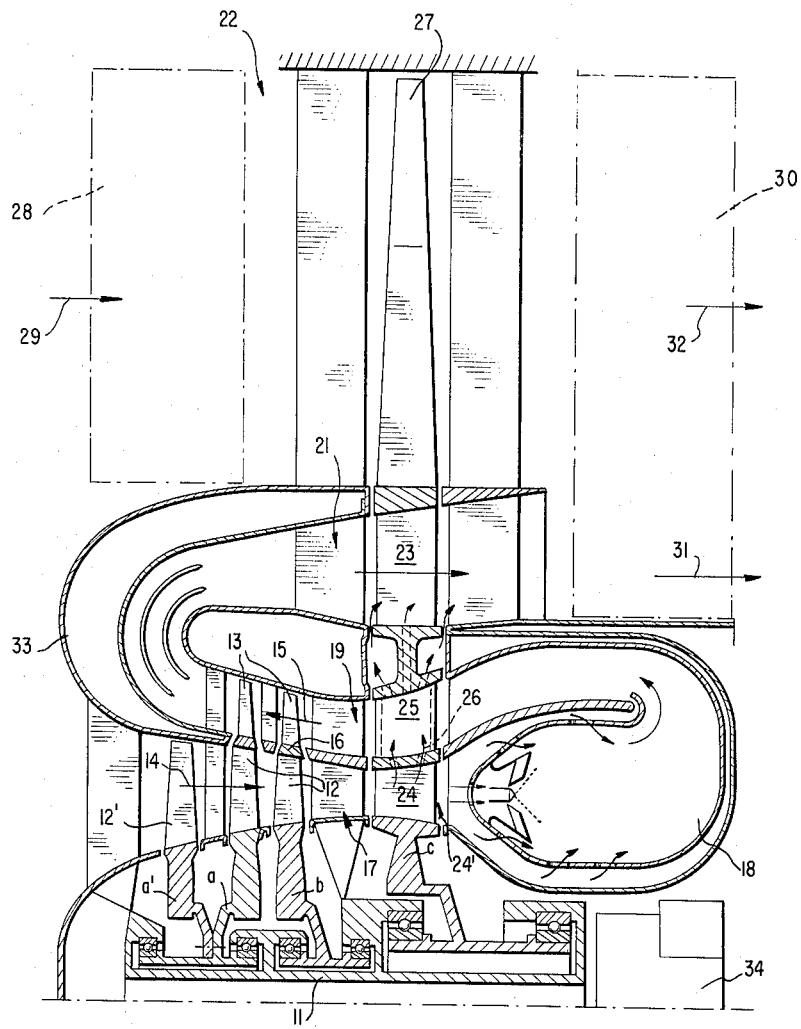
INVENTOR
HUBERT J. GRIEB
BY
Dicke and Craig
ATTORNEYS

United States Patent Office 3,253,406
Patented May 31, 1966

3,253,406
TURBINE PROPULSION UNIT
Hubert J. Grieb, Stuttgart-Botnang, Germany, assignor to Daimler-Benz Aktiengesellschaft, Stuttgart-Unterturkheim, Germany
Filed July 19, 1963, Ser. No. 296,292
Claims priority, application Germany, July 27, 1962, D 39,469
11 Claims. (Cl. 60—35.6)

The present invention relates to a by-pass gas turbine jet propulsion unit with rotors mutually independently supported, which rotors carry radially inwardly thereof, preferably transsonically or supersonically designed air compressor blades and radially outwardly thereof gas turbine blades and intermediate the same coaxial ring-like members closing off the air compressor flow against the gas turbine flow directed oppositely with respect thereto, and which unit further includes a combustion chamber arranged at the end of the compressor channel that discharges into or terminates into the turbine channel after which the propulsion gases are once more deflected by 180° into the thrust channel of the first propulsion stream or cycle so that the air entering into the compressor and the thrust gases or propulsion gases leaving the propulsion unit have the same direction of flow, whereby an additional rotor in the form of a turbo-fan is provided that carries radially inwardly thereof turbine blades and radially outwardly thereof fan blades, the latter rotating within the flow channel of the second thrust stream or cycle of the propulsion unit. In gas turbine propulsion units of the type mentioned hereinabove it is known to guide the propelling gases leaving the turbine channel, within which the compressor drive turbines rotate, through the staationary inlet guide blades of the second propulsion or thrust stream radially outwardly and thereupon to deflect or reverse the same by 180° so that the thrust channel of the first stream is disposed radially outwardly whereas the thrust channel or by-pass duct of the second propulsion unit stream, the turbo-fan stream, is located radially inwardly thereof. The fan blades are seated thereby in several rows on a rotor which carries radially inwardly turbine blade rows which run or rotate also within the aforementioned turbine channel adjoining the combustion chamber.

In contradistinction to the known type of construction of counter-flow propulsion units, the present invention essentially consists in that the by-pass ductor thrust channel forms the radially outer flow channel and that the turbo-fan rotor extends radially over all four flow channels, namely, the compressor channel, the turbine channel, the thrust channel of the first stream and the by-pass duct of the second thrust stream, as well as, as viewed in the direction of the compressor air flow, being arranged in front of the combustion chamber and having the turbine blades thereof rotating within the thrust channel of the first propulsion unit stream.

According to a further feature of the present invention, it is additionally proposed to so construct and design the spokes of the turbo-fan rotor located within the air compressor channel and within the turbine channel such that they are aerodynamically without any effect at least during full load operation of the drive unit. It is thereby particularly appropriate to so construct the air passage channels disposed in a diffuser-like manner between the spokes of the turbo-fan rotor that they form a part of the combustion chamber inlet diffuser.

A further feature of the present invention essentially consists in that adjustable inlet guide blades for the control of the inflowing air for the second stream of the by-pass duct are provided within the space disposed ahead of the fan blade, and adjustable outlet guide blades for the control of the thrust streams of both streams or cycles of the propulsion unit are provided within the space behind the turbo-fan blades.

The free space enclosed by the rear part of the combustion chamber may be utilized for the arrangement of auxiliary aggregates or units.

The features in accordance with the present invention lead, with the propulsion unit basic conception envisaged by the present invention, to an extremely short construction with very small constructional volume as well as very low weight. The turbo-fan rotor disposed approximately in the center of the drive or propulsion unit together with the radially outwardly rotating blade row thereof creates favorable conditions for the arrangement of adjustable pre-guide and post-guide blades for the control of the air flowing into the second thrust stream or cycle as well as for the control of the streams or jets leaving both thrust streams or cycles. The manner of construction proposed in accordance with the present invention permits extremely large by-pass conditions because the ratio between the inner diameter of the turbine of the turbo-fan rotor and the outer diameter of the by-pass duct is relatively large. As a result thereof, the aerodynamic load of the turbine is kept realtively small. The arrangement of the turbo-fan rotor in front of the combustion chamber produces a very elongated inlet diffuser to the combustion chamber without increasing thereby the overall constructional length of the propulsion unit. A long combustion chamber inlet diffuser, wherein the channels between the spokes of the turbo-fan rotor, being aerodynamically without effect, may be utilized for the formation of the forward part of the combustion chamber inlet diffuser, is particularly important with supersonic constructions of the compressor, as the air stream will otherwise leave the same with velocities which are excessive for the combustion chamber. Additionally, the arrangement of the turbo-fan rotor proposed in accordance with the present invention leads to an increase in length of the combustion chamber discharge dimension ahead of the turbine inlet whereby a favorable temperature distribution is enhanced which again permits an increase of the average turbine inlet temperature. In other words, the absolutely necessary great lengths for the combustion chamber inlet diffuser and the combustion chamber discharge or, respectively, the turbine inlet are utilized at the same time by the proposed arrangement of the turbo-fan rotor so that its axial length will not enter into the over-all length of the drive unit.

The proposed propulsion drive unit construction is suitable above all for installation in airplanes as a lifting propulsion unit.

Accordingly, it is an object of the present invention to provide a by-pass gas turbine propulsion drive unit of the type described hereinabove which eliminates those shortcomings encountered in the prior art constructions also mentioned hereinabove and which is particularly suitable for supersonic installations.

It is another object of the present invention to provide a by-pass gas turbine propulsion unit which is of extremely short over-all construction, requires a relatively small structural volume, and involves a relatively low constructional weight.

A further object of the present invention resides in the provision of a by-pass gas turbine propulsion unit that creates favorable conditions for the provision of adjustable inlet and outlet guide blades for the selective control of the air flowing into the second thrust stream as well as for the selective control of the discharged gases flowing out of both streams or cycles.

Another object of the present invention resides in the provision of a by-pass gas turbine unit of the type described hereinabove which permits extremely large by-pass conditions, assures relatively small aerodynamic loading of the turbine, and provides a very long inlet diffuser to the combustion chamber without increasing the over-all length of the propulsion unit.

A still further object of the present invention resides in the provision of a by-pass gas turbine propulsion unit which permits the design of combustion chamber inlet diffusers of sufficiently large length without necessitating that the increased length in the inlet diffuser be reflected in the over-all length of the propulsion unit.

These and further objects, features, and advantages of the present invention will become more obvious from the following description when taken in connection with the accompanying drawing which shows, in the single figure thereof, one embodiment in accordance with the present invention.

Referring now to the drawing which shows in the single figure thereof a by-pass gas turbine propulsion unit in longitudinal cross-sectional view, reference numeral 11 designates therein a shaft fixed in the engine housing. The individual rotors a, b, are rotatably supported on the shaft 11 independently of one another and carry radially inwardly thereof the air compressor blades 12, radially outwardly thereof the turbine blades 13, and intermediate thereof the coaxial rings 16, closing off the air compressor flow 14 against the oppositely directed gas-turbine flow 15. The combustion chamber 18 is disposed at the end of the air compressor channel generally designated by reference numeral 17. The hot propulsion gases are deflected by 180° within the combustion chamber 18 or behind the same and flow into the turbine channel generally designated by reference numeral 19 where they form the gas-turbine stream flow 15 which drives both rotors a and b. The propulsion gases are once more deflected by 180° behind the turbine channel 19 and reach then into the thrust channel 21 from which they are discharged into the atmosphere with the production of thrust, forming the first thrust stream or cycle.

A further rotor, namely, the turbo-fan rotor C is arranged located in front of the combustion chamber 18 which rotor c carries radially outwardly fan blades 27 rotating within the by-pass duct or channel generally designated by reference numeral 22 of the second thrust stream. The rotor c is driven by the turbine blades 23 provided within the thrust channel 21 which are loaded or acted upon by the propulsion gases flowing therethrough. The channels disposed between the spokes 24 of the rotor c which are constructed in a diffuser-like manner form the forward part of the combustion chamber inlet 24' and constitute a combustion chamber inlet diffuser; the channels between the rotor spokes 25 form an extended combustion chamber discharge or turbine inlet, respectively.

The rotor a is provided in front thereof with a first compressor stage a' having compressor blades 12' so that the space in front of the blades 12 of the blade a which is enclosed by the forwardly drawn elbow portion 33 is utilized since more compressor stages 12, 12' may be accommodated than turbine stages 13 so that the pressure increases per compressor stage may be kept lower.

In order to cool the spokes 25 effectively, they are constructed hollow and are supplied with cooling air 26 from the compressor channel 17.

Adjustable inlet guide blades 28 for the control of the air 29 flowing into the by-pass duct or channel 22 are provided within the space disposed in front of the fan blades 27, and adjustable outlet guide blades 30 for the control of both thrust streams 31 and 32 are provided within the space behind the blades 27. The two rows of blades 28 and 30 do not extend beyond the entire length of the propulsion unit.

Auxiliary aggregates or units 34 are arranged within the free space enclosed by the combustion chamber 18.

While I have shown and described one embodiment in accordance with the present invention, it is understood that the same is not limited thereto but is susceptible of numerous changes and modifications within the spirit and scope thereof, and I therefore do not wish to be limited to the details shown and described herein but intend to cover all such changes and modifications as are encompassed by the scope of the appended claims.

I claim:
1. A by-pass gas turbine propulsion unit, comprising:
   compressor channel means,
   turbine channel means, a plurality of mutually independently supported rotor means, said rotor means being provided radially inwardly with air compressor blade means, radially outwardly with gas turbine blade means and intermediate said two radially inward and radially outward blade means with coaxial annular means closing the air compressor flow against the oppositely directed gas turbine flow within said two channel means, respectively,
   combustion chamber means arranged at the end of said compressor channel means, said combustion chamber means discharging into said turbine channel means,
   thrust channel means for a first stream of said propulsion unit,
   connecting means operatively connecting said turbine channel means with said first stream thrust channel means to deflect the propulsion gases by about 180° during flow from said turbine channel means into said first stream thrust channel means so that the air entering the compressor has the same direction of flow as the propulsion gases leaving said first stream thrust channel means,
   by-pass channel means for a second stream of the propulsion unit,
   and further rotor means carrying radially inwardly turbine blade means and radially outwardly fan blade means, said fan blade means rotating within the flow channel of the second stream,
   the by-pass channel means forming the radially outer flow channel, said further rotor means extending over all four channel means of both streams of the propulsion unit and being arranged, as viewed in the direction of flow of the compressor air, in front of the combustion chamber means, and the turbine blade means of said further rotor means rotating within the thrust channel means of the first stream of said propulsion unit.

2. A by-pass gas turbine propulsion unit as defined in claim 1, wherein said further rotor means is provided with spokes positioned within the compressor channel means and turbine channel means, said spokes being so constructed and arranged that they are at least during full load operation of the drive unit without effect aerodynamically.

3. A by-pass gas turbine propulsion unit as defined in claim 2, wherein the air inlet channels disposed between the spokes of said further rotor means form a part of the over-all combustion chamber inlet diffuser.

4. A by-pass gas turbine propulsion unit as defined in claim 3 further including cooling air bore means branching off from the air passage channels disposed between said spokes for supplying cooling air to those of said spokes disposed within said turbine channel means, said last-mentioned spokes being of hollow construction.

5. A by-pass gas turbine propulsion unit as defined in claim 2, further including cooling air bore means branching off from the air passage channels disposed between said spokes for supplying cooling air to those of said spokes disposed within said turbine channel means, said last-mentioned spokes being of hollow construction.

6. A by-pass gas turbine propulsion unit as defined in claim 1, further including adjustable inlet guide means for the control of the inflowing air for the second stream disposed within the space in front of the fan blade means, and further adjustable outlet guide means for controlling the flow of both streams within the space behind the fan blade means, the two rows of said guide blade means staying within the over-all structure of the drive unit in the axial direction.

7. A by-pass gas turbine propulsion unit as defined in claim 6, further including auxiliary aggregates of the propulsion unit arranged within the space that is enclosed by the adjustable outlet guide blade means.

8. A by-pass gas turbine propulsion unit as defined in claim 6, wherein said further rotor means are provided with spokes positioned within the compressor channel means and turbine channel means, said spokes being so constructed and arranged that they are at least during full load operation of the drive unit without effect aerodynamically.

9. A by-pass gas turbine propulsion unit as defined in claim 8, wherein the air inlet channels disposed between the spokes of said further rotor means form a part of the over-all combustion chamber inlet diffuser.

10. A by-pass gas turbine propulsion unit as defined in claim 1, wherein said air compressor blade means are designed as trans-sonic compressor blades.

11. A by-pass gas turbine propulsion unit as defined in claim 1, wherein said air compressor blade means are designed as supersonic compressor blades.

No references cited.

MARK NEWMAN, *Primary Examiner.*